(12) United States Patent
Chaiken et al.

(10) Patent No.: US 12,196,695 B2
(45) Date of Patent: Jan. 14, 2025

(54) SYSTEMS AND METHODS FOR DETECTING MECHANICAL STRAIN ON A BALL OF A BALL GRID ARRAY

(71) Applicant: Dell Products L.P., Round Rock, TX (US)

(72) Inventors: Craig L. Chaiken, Pflugerville, TX (US); Hou-Chun Wang, Linkou Dist. (TW); Kuo-Chieh Lai, New Taipei (TW); Hong-Ling Chen, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 18/170,684

(22) Filed: Feb. 17, 2023

(65) Prior Publication Data

US 2024/0280524 A1     Aug. 22, 2024

(51) Int. Cl.
*G01N 27/02* (2006.01)

(52) U.S. Cl.
CPC .................... *G01N 27/02* (2013.01)

(58) Field of Classification Search
CPC ........................................ G01N 27/02
USPC ......................... 324/650, 649, 600
See application file for complete search history.

(56) References Cited

U.S. PATENT DOCUMENTS

| | | | |
|---|---|---|---|
| 4,683,422 A | 7/1987 | Goodson | |
| 5,827,967 A | 10/1998 | Ueyanagi | |
| 6,471,526 B1 | 10/2002 | Harper, Jr. | |
| 10,056,356 B1* | 8/2018 | Liu | H01L 25/0753 |
| 10,159,151 B1* | 12/2018 | Liu | H05K 1/0295 |
| 11,477,890 B2* | 10/2022 | Chandra | H05K 1/025 |
| 2010/0171510 A1 | 7/2010 | Ren | |
| 2012/0134612 A1 | 5/2012 | Snelick | |
| 2015/0059487 A1 | 3/2015 | Ahmad | |
| 2017/0363674 A1 | 12/2017 | Douglass | |
| 2019/0198480 A1* | 6/2019 | Kelly | G11C 5/066 |
| 2023/0402293 A1* | 12/2023 | LoBianco | H01L 21/563 |
| 2024/0280646 A1* | 8/2024 | Chaiken | G01R 31/54 |

* cited by examiner

Primary Examiner — Giovanni Astacio-Oquendo
(74) Attorney, Agent, or Firm — Jackson Walker L.L.P.

(57) ABSTRACT

An information handling system may include a circuit board, an integrated circuit package mounted on the circuit board, the integrated circuit package comprising: a plurality of solder balls for electrically coupling the integrated circuit package to the circuit board, the plurality of solder balls comprising a first solder ball and a second solder ball, an internal electrical coupling coupled between the first solder ball and the second solder ball, and a management controller electrically coupled to the internal electrical coupling, the first solder ball, and the second solder ball, and configured to provide out-of-band management facilities for management of the information handling system, the management controller further configured to detect whether an impedance discontinuity has occurred with respect to one or both of the first solder ball and the second solder ball.

12 Claims, 2 Drawing Sheets

SYSTEMS AND METHODS FOR DETECTING MECHANICAL STRAIN ON A BALL OF A BALL GRID ARRAY

TECHNICAL FIELD

The present disclosure relates in general to information handling systems, and more specifically to detecting mechanical strain on a circuit board, for example a motherboard.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ one or more circuit boards. A circuit board may broadly refer to a printed circuit board (PCB), printed wiring board (PWB), printed wiring assembly (PWA) etched wiring board, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board. A circuit board may be used to implement a motherboard, a riser card, a mezzanine card, a paddle card, and/or many other components of an information handling system.

One problem sometimes experienced by circuit boards is small, sometime microscopic, solder cracks caused by excessive strain on a circuit board during the manufacturing process and/or rough handling of the circuit board after manufacturing. Such solder cracks are often invisible, even when using a microscope, but can result in information handling system failures when an information handling system (e.g., a laptop or notebook computer) is lifted, or when the circuit board operates within certain temperature ranges. While all circuit board components are at risk for solder cracks, one significant risk is on ball grid array (BGA) integrated circuits, given that such integrated circuits perform the bulk of the functionality on a circuit board. Accordingly, systems and methods to detect the presence of such strain-induced open circuits may be desired.

SUMMARY

In accordance with the teachings of the present disclosure, the disadvantages and problems associated with detecting mechanical strain to a ball of a ball grid array may be reduced or eliminated.

In accordance with embodiments of the present disclosure, an information handling system may include a circuit board, an integrated circuit package mounted on the circuit board, the integrated circuit package comprising: a plurality of solder balls for electrically coupling the integrated circuit package to the circuit board, the plurality of solder balls comprising a first solder ball and a second solder ball, an internal electrical coupling coupled between the first solder ball and the second solder ball, and a management controller electrically coupled to the internal electrical coupling, the first solder ball, and the second solder ball, and configured to provide out-of-band management facilities for management of the information handling system, the management controller further configured to detect whether an impedance discontinuity has occurred with respect to one or both of the first solder ball and the second solder ball.

In accordance with these and other embodiments of the present disclosure, a method may include outputting a known signal on a first pin of a management controller electrically coupled to a plurality of solder balls of an integrated circuit package for electrically coupling the integrated circuit package to a circuit board, wherein the plurality of solder balls comprise a first solder ball and a second solder ball, and the management controller is also electrically coupled to an internal electrical coupling coupled between the first solder ball and the second solder ball, receiving an input signal on a second pin of the management controller, and determining if an impedance discontinuity exists based on whether the input signal is equivalent to the known signal.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a management controller of an information handling system, wherein the management controller is configured to provide out-of-band management facilities for management of the information handling system: (i) output a known signal on a first pin of a management controller electrically coupled to a plurality of solder balls of an integrated circuit package for electrically coupling the integrated circuit package to the circuit board, wherein the plurality of solder balls comprise a first solder ball and a second solder ball, and the management controller is also electrically coupled to an internal electrical coupling coupled between the first solder ball and the second solder ball; (ii) receive an input signal on a second pin of the management controller; and (iii) determine if an impedance discontinuity exists based on whether the input signal is equivalent to the known signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
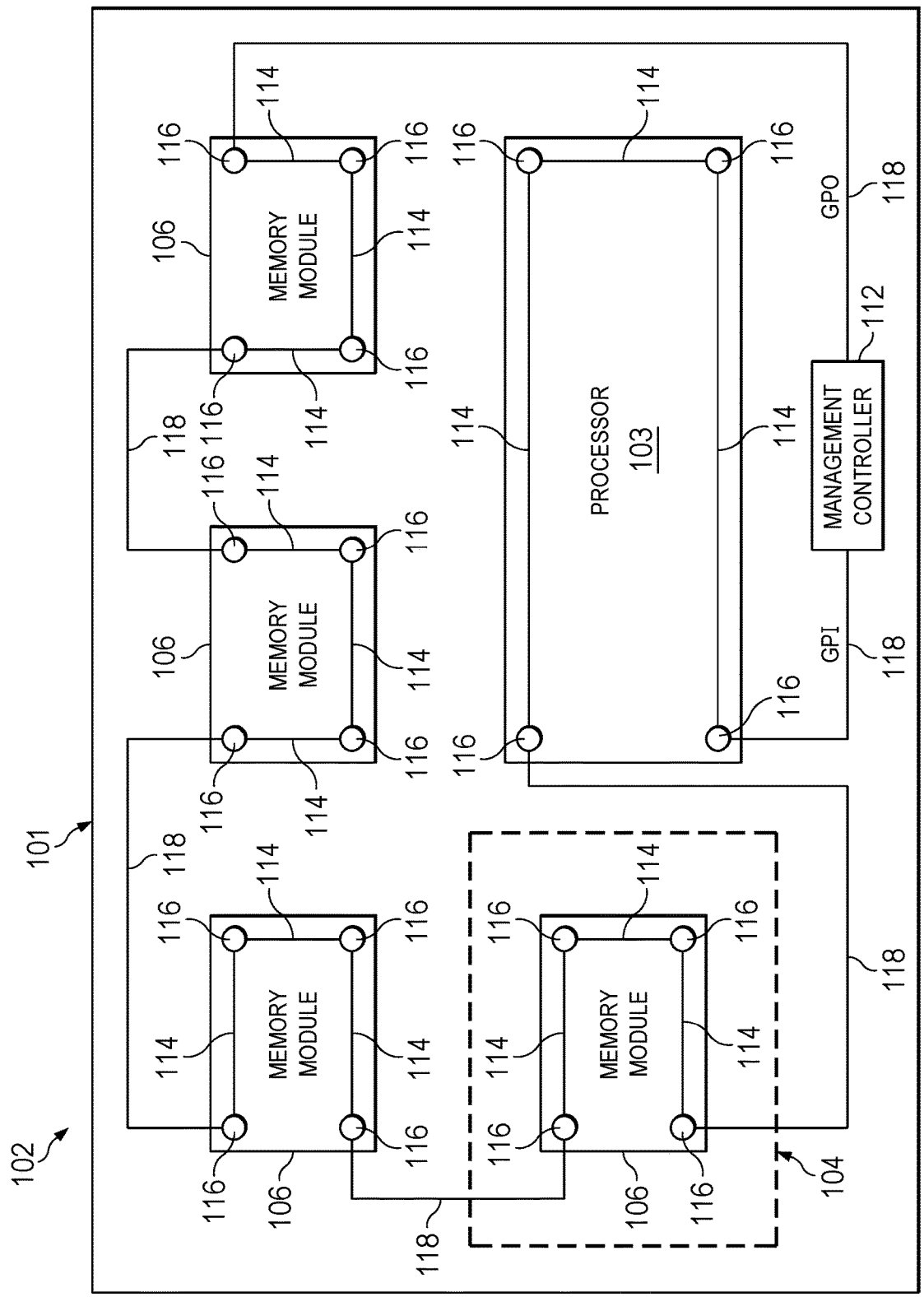
FIG. 1 illustrates a block diagram of selected components of an example information handling system, in accordance with certain embodiments of the present disclosure.
Figure 2:
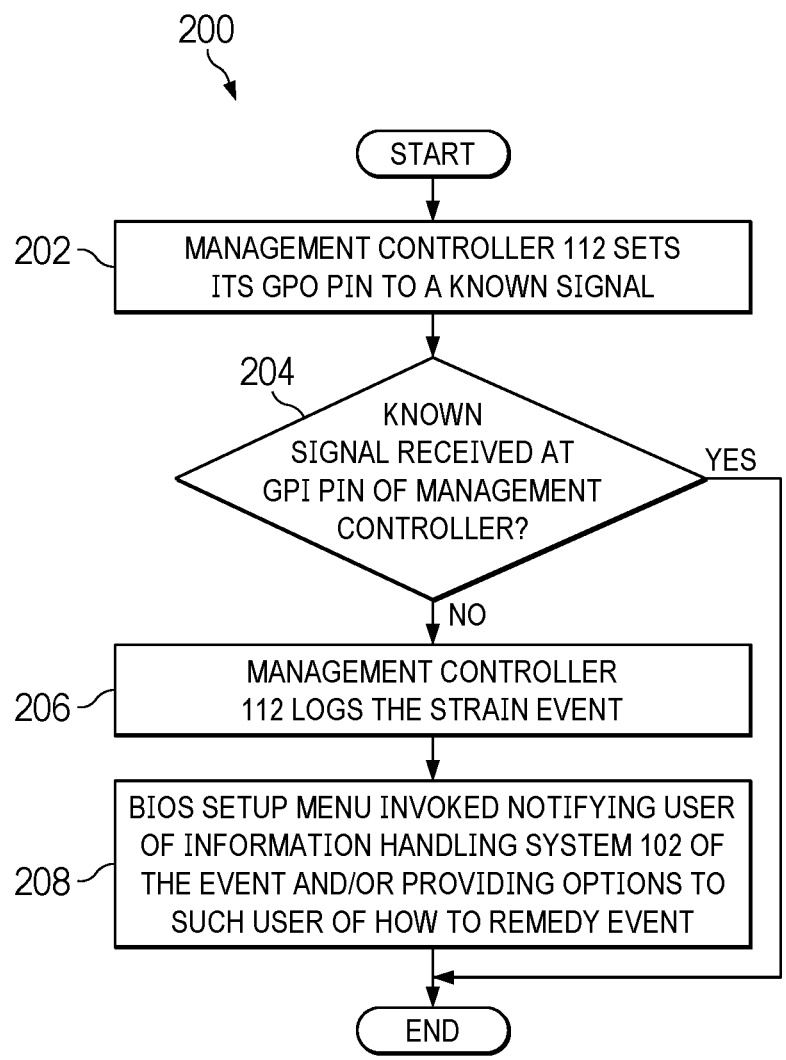
FIG. 2 illustrates a flow chart of an example method for detecting and processing mechanical strain on a ball of a ball grid array, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RA), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

For the purposes of this disclosure, a circuit board may broadly refer to a printed circuit board (PCB), printed wiring board (PWB), printed wiring assembly (PWA) etched wiring board, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of selected components of an example information handling system 102, in accordance with certain embodiments of the present disclosure. It is noted that the various components depicted in FIG. 1 may not be drawn to scale.

In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a circuit board 101 (e.g., a motherboard or backplane) having mounted and/or formed thereon a processor 103, a memory 104 comprising a plurality of memory modules 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

In some embodiments, one or more of processor 103 and memory modules 106 may be implemented using ball grid array integrated circuits, by which an integrated circuit package is electrically coupled to a circuit board via an array of solder balls, which are briefly heated during manufacturing to melt the solder balls sufficiently to create electrical connections between the integrated circuit and circuit board, before being cooled to return the solder to its solid state.

As depicted in FIG. 1, each integrated circuit package of one or more of processor 103 and memory modules 106 may have one or more internal electrical couplings 114 between pairs of solder balls 116. For purposes of clarity and exposition, each of processor 103 and memory modules 106 are shown in FIG. 1 having three internal electrical couplings 114 routed among solder balls 116 located at the corners of the integrated circuit packages of processor 103 and memory modules 106. However, it is understood that processor 103 and/or a memory module 106 may have any suitable number of internal electrical couplings 114, including as few as one internal electrical coupling 114 between two solder balls 116, or significantly more electrical couplings 114 than the three shown in FIG. 1. Further, it is also understood that internal electrical couplings 114 are not limited to being coupled between solder balls 116 located at the corners of integrated circuit packages of processor 103 and memory modules 106, and may be coupled between solder balls 116 located at any suitable location within an integrated circuit package.

Furthermore, while FIG. 1, for purposes of clarity and exposition, depicts the presence of only four solder balls 116 at the corners of each of the integrated circuit packages for processor 103 and memory modules 106, it is understood that an integrated circuit package may include numerous (e.g., dozens) of solder balls 116 of any suitable geometry, including many solder balls 116 arranged in a two-dimensional array.

In addition, each internal electrical coupling 114 may be routed between a pair of solder balls 116 within an integrated circuit package, but not necessarily routed within the integrated circuit (e.g., semiconductor die) itself. Accordingly, routing of internal electrical couplings 114 among solder balls 116 may be performed without modifications to integrated circuits themselves, meaning existing integrated circuits can be packaged within integrated circuit packages having the desired routing of internal electrical couplings 114 among solder balls 116.

Management controller 112 may be configured to provide out-of-band management facilities for management of information handling system 102. Such management may be made by management controller 112 even if information handling system 102 is powered off or powered to a standby state. Management controller 112 may include a processor, memory, out-of-band network interface separate from and physically isolated from an in-band network interface of information handling system 102, and/or other embedded information handling resources. In certain embodiments, management controller 112 may include or may be an integral part of a baseboard management controller (BMC) or a remote access controller (e.g., a Dell Remote Access Controller or Integrated Dell Remote Access Controller). In other embodiments, management controller 112 may include or may be an integral part of a chassis management controller (CMC). In yet other embodiments, management controller 112 may include or may be an integral part of an embedded controller (EC). Management controller 112 may include firmware comprising a program of executable instructions configured to be read and executed by management controller 112 in order to carry out the functionality of management controller 112, including functionality of management controller 112 described herein.

As also shown in FIG. 1, the various internal electrical couplings 114 and solder balls 116 to which they are coupled may be arranged in a series configuration (e.g., with traces 118 formed on circuit board 101 electrically coupling solder balls 116 of different integrated circuit packages to one another. A general-purpose output (GPO) pin of management controller 112 may be electrically coupled to a first electrical node at one end of the series configuration and a general-purpose input (GPI) pin of management controller 112 may be coupled to a second electrical node at the other end of the series configuration.

In operation, if a mechanical strain force or torsion is applied to circuit board 101 capable of cracking solder, one or more of solder balls 116 may crack, resulting in an impedance discontinuity. In some instances, such impedance discontinuity may result in an open circuit, while in other instances, such impedance discontinuity may result from a partial crack in one or more of solder balls 116, and thus may result in a significant increase in impedance through the series configuration.

Accordingly, in order to detect whether such an impedance discontinuity has occurred, management controller 112 may output a known signal (e.g., 3.3 volts) on its GPO pin, and determine if the same signal is received at its GPI pin. If the known signal is received at the GPI pin, then no strain-force induced event is determined to have occurred. However, if the known signal is not received at the GPI pin (e.g., significantly less than 3.3 volts), then a strain-force induced event may have occurred.

In addition to processor 103, memory 104, and management controller 112, information handling system 102 may include one or more other information handling resources.

FIG. 2 illustrates a flow chart of an example method 200 for detecting and processing mechanical strain on a ball (e.g., a solder ball 116) of a ball grid array, in accordance with embodiments of the present disclosure. According to certain embodiments, method 200 may begin at step 202. As noted above, teachings of the present disclosure may be implemented in a variety of configurations of information handling system 102 as shown in FIG. 1. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, management controller 112 may set its GPO pin to a known signal (e.g., 3.3 volts). At step 204, management controller 112 may determine if the known signal is received at its GPI pin. If the known signal (e.g., 3.3 V) is received at the GPI pin, no impedance discontinuity exists within solder balls 116, and method 200 may end. Otherwise if the known signal is not received at the GPI pin (e.g., a voltage significantly less than 3.3 volts is received), then an impedance discontinuity may exist within one or more solder balls 116, and method 200 may proceed to step 206.

At step 206, management controller 112 may log the strain event. As a result, at step 208, a basic input/output system (BIOS) setup menu may be invoked (e.g., at a subsequent startup or boot session of information handling system 102) notifying a user of information handling system 102 of the event and/or providing options to such user of how to remedy the event. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, or any other system such as that shown in FIG. 1 operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a circuit board;
   an integrated circuit package mounted on the circuit board, the integrated circuit package comprising:
      a plurality of solder balls for electrically coupling the integrated circuit package to the circuit board, the plurality of solder balls comprising a first solder ball and a second solder ball; and
      an internal electrical coupling coupled between the first solder ball and the second solder ball; and
   a management controller electrically coupled to the internal electrical coupling, the first solder ball, and the second solder ball, and configured to provide out-of-band management facilities for management of the information handling system, the management controller further configured to detect whether an impedance discontinuity has occurred with respect to one or both of the first solder ball and the second solder ball.

2. The information handling system of claim 1, wherein the management controller is further configured to:
   output a known signal on a first pin of the management controller;
   receive an input signal on a second pin of the management controller; and
   determine if the impedance discontinuity exists based on whether the input signal is equivalent to the known signal.

3. The information handling system of claim 2, wherein:
   the first pin is a general-purpose output pin of the management controller; and
   the second pin is a general-purpose input pin of the management controller.

4. The information handling system of claim 1, wherein the management controller is further configured to log an event associated with the occurrence of the impedance discontinuity.

5. The information handling system of claim 1, wherein the internal electrical coupling is one of a plurality of internal electrical couplings coupled electrically in a series configuration with the integrated circuit package, each of the plurality of internal electrical couplings coupled between a pair of the plurality of solder balls.

6. A method comprising:
   outputting a known signal on a first pin of a management controller electrically coupled to a plurality of solder balls of an integrated circuit package for electrically coupling the integrated circuit package to a circuit board, wherein the plurality of solder balls comprise a first solder ball and a second solder ball, and the management controller is also electrically coupled to an internal electrical coupling coupled between the first solder ball and the second solder ball;
   receiving an input signal on a second pin of the management controller;
   determining if an impedance discontinuity exists based on whether the input signal is equivalent to the known signal; and
   logging, by the management controller, an event associated with the occurrence of the impedance discontinuity.

7. The method of claim 6, wherein:
   the first pin is a general-purpose output pin of the management controller; and
   the second pin is a general-purpose input pin of the management controller.

8. The method of claim 6, wherein the internal electrical coupling is one of a plurality of internal electrical couplings coupled electrically in a series configuration with the integrated circuit package, each of the plurality of internal electrical couplings coupled between a pair of the plurality of solder balls.

9. An article of manufacture comprising:

a non-transitory computer readable medium; and computer-executable instructions carried on the non-transitory computer readable medium, the instructions readable by a processor, the instructions, when read and executed, for causing the processor to, in a management controller of an information handling system, wherein the management controller is configured to provide out-of-band management facilities for management of the information handling system:

output a known signal on a first pin of a management controller electrically coupled to a plurality of solder balls of an integrated circuit package for electrically coupling the integrated circuit package to the circuit board, wherein the plurality of solder balls comprise a first solder ball and a second solder ball, and the management controller is also electrically coupled to an internal electrical coupling coupled between the first solder ball and the second solder ball;

receive an input signal on a second pin of the management controller; and determine if an impedance discontinuity exists based on whether the input signal is equivalent to the known signal.

10. The article of claim 9, wherein:

the first pin is a general-purpose output pin of the management controller; and the second pin is a general-purpose input pin of the management controller.

11. The article of claim 9, the instructions for further causing the management controller to log an event associated with the occurrence of the impedance discontinuity.

12. The article of claim 9, wherein the internal electrical coupling is one of a plurality of internal electrical couplings coupled electrically in a series configuration with the integrated circuit package, each of the plurality of internal electrical couplings coupled between a pair of the plurality of solder balls.

* * * * *